No. 895,321. PATENTED AUG. 4, 1908.
C. H. YARRINGTON.
TROLLEY GUARD.
APPLICATION FILED DEC. 17, 1907.
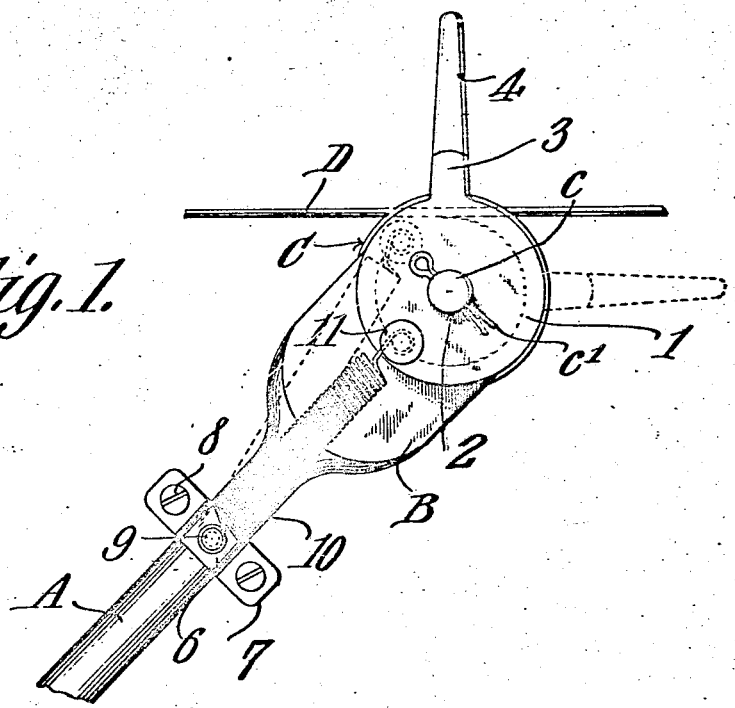
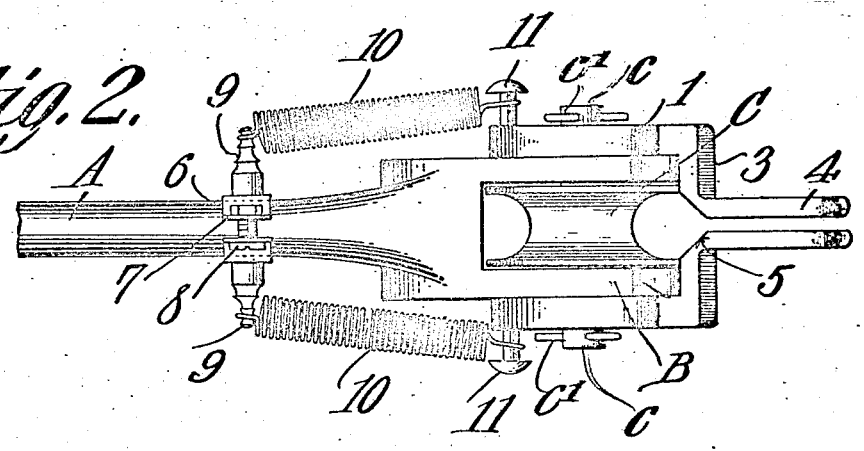
Witnesses
Inventor
Charles H. Yarrington
By
Attorneys

UNITED STATES PATENT OFFICE.

CHARLES H. YARRINGTON, OF WATERBURY, CONNECTICUT.

TROLLEY-GUARD.

No. 895,321.     Specification of Letters Patent.     Patented Aug. 4, 1908.

Application filed December 17, 1907. Serial No. 406,887.

*To all whom it may concern:*

Be it known that I, CHARLES H. YARRINGTON, a citizen of the United States, residing at Waterbury, in the county of New Haven and State of Connecticut, have invented a new and useful Trolley-Guard, of which the following is a specification.

This invention relates to trolley guards, and is designed as an attachment for trolley harps of the usual constructions.

The object of the invention is to provide a guard made up of separately movable interchangeable members which can be readily attached to the trolley harp, and which, when so positioned, will operate to prevent the trolley wheel from leaving the wire.

Another object is to provide guard members designed to be shifted or deflected by the guys supporting the trolley wire, said guard devices being separately movable in this manner as when, for example, the trolley wheel is passing from one wire to another, as at switches.

With these and other objects in view, as will appear as the nature of the invention is better understood, the same consists in the improved construction and novel combination and arrangement of parts, which will be hereinafter more fully described and particularly pointed out in the appended claims.

In the drawings:—Figure 1 is a side elevation of a trolley harp having the present improvements applied thereto, one of the positions of the guard fingers being indicated by dotted lines. Fig. 2 is a plan view of the parts shown in Fig. 1, the guard fingers being shown partly depressed.

Referring to the figures by characters of reference, A designates a trolley pole having a harp B at one end and which may be of the usual construction, there being a trolley wheel C journaled within the harp and upon a removable axle c designed to be held in place in any preferred manner, as by means of cotter pins c'.

The foregoing parts do not constitute any part of the present invention, but are of the usual construction. The guards for use in connection with the trolley harp consist of oppositely disposed independently movable members each comprising a disk 1 having a central orifice 2 for the reception of one end portion of the axle C. The guard arm is formed upon the periphery of the disk, as shown at 3, and partly laps the peripheral portion of wheel C. This arm also extends across one of the wings of the harp B and terminates in an outstanding finger 4. The parts are so proportioned when they are mounted upon the harp that the fingers 4 are spaced apart laterally a sufficient distance to permit the trolley wire D to be inserted therebetween. That portion of each arm 3 overhanging the groove in wheel C is beveled, as shown at 5, the two beveled faces of arms 3 converging toward the fingers 4.

Detachably secured to the pole A are clamping plates 6, each of which has laterally extending wings 7 engaged by bolts 8, or other suitable means, for binding the plates upon the pole. Trunnions 9 extend from the middle portions of these plates, and suitably fastened to each trunnion is one end of a coiled spring 10, the other end of which engages a stud 11 outstanding from the outer face of one of the disks 1. The parts are so proportioned that when held in their normal positions by the springs, the guard fingers 4 extend practically vertically, as indicated in Fig. 1, so as to lap opposite portions of the wire B.

It is to be understood that each member of the guard is a duplicate of the other member, and these members may be made of standard sizes so as to be readily applied to harps of different sizes and constructions. When it is desired to apply the guards to a trolley harp, the fastening devices c' are removed and one disk 1 is placed upon each end portion of axle c, so that the arms 3 will overhang the grooved wheel C. The plates 6 are then fastened to pole A at a sufficient distance from the harp to cause springs 10 to be normally under the proper tension. After the fastening devices c' have been replaced, the device is in condition for use.

To place the wheel C upon the wire D, the same is raised in the usual manner, and if the wire does not pass between the fingers 4, it will strike one of them and deflect it, until the wire becomes seated within the groove in wheel C, whereupon the depressed finger will be returned to its normal or raised position by its spring 10. Should the fingers be brought into contact with a guy such as ordinarily used for supporting trolley wires, they will be promptly swung downwardly thereby, without injury thereto, and the springs, which are placed under stress by this operation, will promptly return the fingers to their normal positions after the guy has been passed. As shown particularly in Fig. 2 the two fingers 4 are normally spaced apart a distance considerably less than the width of the groove in wheel C and therefore the danger of the wheel leaving the trolley wire is greatly reduced because of the fact that these guards overhang the wheel and the distance between the fingers is but slightly greater than the diameter of the wire. By providing the beveled faces 5, the wire D is guided between the fingers 4, when the trolley is lowered, so that the removal of the trolley from the wire is in no wise hindered. It will be noted that the fingers will operate in the same manner whether the trolley be moved forward or backward upon the wire, because the springs tend to operate in the same manner in view of their peculiar disposition.

I claim:—

The combination with a trolley harp and a grooved wheel journaled therein; of an attachment comprising members pivotally mounted upon the outer faces of the harp, guard arms extending inwardly from said members and overhanging the harp and wheel, those portions of the arms overhanging the groove in the wheel being beveled and converging outwardly, guard fingers extending from the beveled ends of the arms and normally spaced apart a distance less than the width of the groove in the wheel and slightly greater than the diameter of the trolley wire, clamping plates adjustably and detachably mounted below the harp, and separate spring connections between said plates and the pivoted members for holding the fingers normally in predetermined positions.

In testimony that I claim the foregoing as my own, I have hereto affixed my signature in the presence of two witnesses.

CHARLES H. YARRINGTON.

Witnesses:
JAMES B. BOLAN,
WILL I. BUNNELL.